United States Patent [19]

Kawaguchi et al.

[11] Patent Number: 4,511,624

[45] Date of Patent: Apr. 16, 1985

[54] ENAMELED WIRES

[75] Inventors: Munetaka Kawaguchi, Aichi; Hirohiko Nakabayashi; Masayoshi Miyake, both of Osaka, all of Japan

[73] Assignee: Sumitomo Electric Industries, Ltd., Osaka, Japan

[21] Appl. No.: 514,851

[22] Filed: Jul. 18, 1983

Related U.S. Application Data

[63] Continuation of Ser. No. 75,761, Sep. 17, 1974, abandoned, which is a continuation of Ser. No. 825,731, Aug. 18, 1977, abandoned, which is a continuation of Ser. No. 540,469, Jan. 3, 1975, abandoned.

[30] Foreign Application Priority Data

Jan. 12, 1974 [JP] Japan .................................. 49-6873
Jan. 12, 1974 [JP] Japan .................................. 49-6874
Jan. 12, 1974 [JP] Japan .................................. 49-6875

[51] Int. Cl.$^3$ ........................ B32B 15/00; H01B 7/00
[52] U.S. Cl. ............................ 428/379; 174/110 SR; 428/375
[58] Field of Search .............................. 428/375, 379; 174/110 SR, 110 R, 110 F; 528/45

[56] References Cited

U.S. PATENT DOCUMENTS

| | | | |
|---|---|---|---|
| 2,899,411 | 8/1959 | Schollenberger | 528/76 |
| 3,038,884 | 6/1962 | Martin et al. | 528/85 |
| 3,252,944 | 5/1966 | Curtis | 427/120 |
| 3,393,177 | 7/1968 | Guest et al. | 528/45 |
| 3,650,788 | 3/1972 | Kamp et al. | 106/14.37 |
| 3,819,586 | 6/1974 | Rudolph et al. | 528/45 |
| 3,933,759 | 1/1976 | Hoeschele | 528/45 |
| 3,947,426 | 3/1976 | Lander | 528/45 |
| 3,988,251 | 10/1976 | Shelby et al. | 428/379 |

FOREIGN PATENT DOCUMENTS

| | | | |
|---|---|---|---|
| 1140534 | 1/1969 | United Kingdom | 528/45 |
| 1195886 | 6/1970 | United Kingdom | 528/45 |

*Primary Examiner*—Lorraine T. Kendell
*Attorney, Agent, or Firm*—Sughrue, Mion, Zinn, Macpeak and Seas

[57] ABSTRACT

An enameled wire which can be safely used for electric machinery such as an electric motor and transformer without causing smoking or fire accidents comprising a conductive wire coated with a thermoplastic straight chain polyurethane having therein the following repeating unit

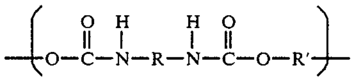

wherein R and R′ each represents a divalent group having at least 2 carbon atoms.

22 Claims, No Drawings

ENAMELED WIRES

This application is a continuation, of application Ser. No. 75,761, filed 9/17/79, now abandoned, which is a continuation of Ser. No. 825,731, filed 8/18/77, now abandoned, which is a continuation of Ser. No. 540,469, filed 1/13/75, now abandoned.

BACKGROUND OF THE INVENTION

1. Field of the Invention

The present invention relates to an improved enameled wire and more particularly it relates to an enameled wire which can prevent the occurrence of smoking accidents of electric machinery such as a transformer, an electric motor, etc., (in particular, a small-sized transformer and a small-sized electric motor) in which the enameled wire is used. Furthermore, if necessary, the enameled wire of this invention can prevent the occurrence of smoking accidents, fire accidents, or electric shock accidents of electric machinery by such a mechanism in which the enamel layer or the insulration layer of the enameled wire is easily melted, when the enameled wire reaches a definite temperature, to short-circuit the wires and thus to fuse the wire at the portion which is not short-circuited.

2. Description of the Prior Art

Recently, smoking accidents, fire accidents or electric shock accidents by houshold electric articles such as televisions, etc., have become more and more frequent and thus it has strongly been desired to prevent these accidents. In response to such a desire, the safety regulations for electric and electronic equipment or articles have become severe in each country. This problem will be easily solved for the equipment of utilizing low voltage and low electric power of these types of electric and electronic equipment, but televisions, electronic ranges, etc., which use high voltage and high electric power have various disadvantages in preventing smoking accidents, fire accidents, or electric shock accident and design of this equipment to overcome these problems has been strongly demanded. According to the statistics for television receivers in the United States of America as an example of the occurrence of fire accidents and smoking accidents for the parts of such electronic equipment, accidents due to the transformer ranks first or occupies about 30 percent of all of the accidents and about half of these accidents arise in transformers and high-voltage circuits. Therefore, it has strongly been demanded that the electric circuits of such parts be automatically broken before the occurrence of [the ] fire or electric shock accidents without generating smoke when abnormal conditions with such electric or electronic equipment occur rather than to render such equipment or parts thereof simply flame retardant. For meeting such demand, transformer makers have attempted to achieve reliability in transformers at the occurrence of difficulties by employing a fusing system such as a bimetal system in the transformers as a safeguard against such. However, in this case, if, for example, the cost of a small-sized transformer for transistorized equipment is assumed to 100, the cost of the fuse used for the transformer becomes about 30 to 100, which increases greatly the cost of the equipment containing a fuse system, and further the employment of such a fuse system is also undesirable from the standpoint of space for the transistorized equipment.

In spite of the increase in cost, under the present conditions, manufacturers tend to employ such a fuse system in electric or electronic equipment to meet the severe safety regulations. The same is true for small-sized electric motors used for tape recorders, etc. Accordingly, it has been keenly desired to prevent the occurrence of smoking accidents and fire accidents in the case of an abnormal temperature increase due to over load, etc., without increasing the cost of the equipment.

SUMMARY OF THE INVENTION

A primary object of this invention is, therefore, to provide an enameled wire by which the aforesaid difficulties can be overcome without employing any additional means in conventional electric and electronic equipment such as transformers, small-sized electric motors, etc., and without increasing greatly the cost for the equipment by providing to the enameled wire itself the function of a fuse.

That is, it has been discovered that the above-described object of this invention is attained by using an enameled wire prepared by coating and baking on a wire enamel mainly comprising a polyurethane polymer used in this invention, whereby through use of such a wire the electric circuit for a transformer or a small-sized electric motor is broken automatically without causing smoking accidents, fire accidents, or electric shock accidents in the case where difficulties occur in the parts of electric or electronic equipment such as transformers and electric motors. In this case, the insulation layer or film of the enameled wire of this invention used in such electric equipment is melted at a definite temperature to break the insulation between the wire, which results in attaining the aforesaid object of this invention.

Thus, according to the present invention, there is provided an enameled wire comprising a wire coated with a thermoplastic straight chain polyurethane substantially comprising the repeating unit

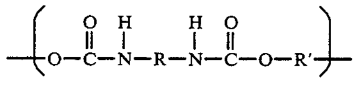

wherein R and R' each represents a divalent group having at least 2 carbon atoms.

DETAILED DESCRIPTION OF THE INVENTION

The characteristics required for the enameled wire ued for such a purpose as described are quite delicate and severe. That is, the enameled wire must have, under ordinary or normal working conditions, sufficient insulating properties as well as properties such as thermostability, solderbility, heat-shock resistance, chemical stability, high adhesion between the insulating layer and the conductor, windability, etc., which are not inferior to those of conventional enameled wires but, on the other hand, must have the property that the insulating layer or enamel layer of the enameled wire is, when the enameled wire reaches a definite temperature, very sensitive to temperature and melted accurately at such temperature to short-circuit the wires to each other, the latter property being commonly inconsistent with the former properties. Moreover, in the United States a cheese cloth placed on the surface of a transformer must be neither scorched nor burned when burning difficulties of the transformer occur and to meet this requirement it is considered that the surface of the transformer be always maintained at temperatures below about 250° C. Therefore, on considering the insulation characteristics of the enameled wire ordinarily, it is necessary that the insulating layer of the enameled wire be melted at an inside temperature of about 150° to 250°, most preferably 170° to 230° C. to short-circuit the wires. This temperature is quite low as compared with common thinking for conventional enameled wires and the aforesaid requirement is in contrast to the conventional requirement for obtaining a material having a cut-thru temperature as high as possible since ordinary investigation and development for new enameled wires are directed to the discovery of materials having high thermostability or heat resistance. That is, such a requirement is against common thinking for conventional enameled wires and enameled wires having the above-described properties are not known at present. Also, as shown in the reference example hereinafter, it has been found that only by the property of a low cut-thru temperature or melting point, it is difficult to short-circuit wires at about that temperature and to prevent the generation of smoke in case of a burning accident as well as it has also been found that the range of selection of insulating materials is limited to a quite narrow range and thus it is considered that very specific materials can be used for the purpose.

As the result of various investigations of these factors, it has been discovered that the enameled wire of this invention as will be explained later in detail has excellent properties such as thermostability, solderbility, heat-shock resistance, chemical stability, adhesion between the insulating layer and the conductor, windability, etc., and the insulating layer of the enameled wire is melted, when it reaches a definite temperature, very sensitively and very accurately at the temperature which fuses the wire without substantially generating smoke in the case of burning difficulties of electric or electronic equipment in which the enameled wire is used not only at the beginning of the use of the equipment but also after subjecting the equipment to heat aging for a long period of time.

The enameled wire of this invention can be used for many purposes but particularly excellent effects are obtained when the enameled wire is used for small-sized transformers used for television receivers, electric ranges, stereo phonographs, radios, etc., and also for small-sized electric motors used for tape recorders, stereo phonographs, measuring instruments, etc. For these purposes, the diameter of the enameled wire of this invention is usually from about 0.05 mm to 0.4 mm.

The enameled wire of this invention can be one coated with the above-described thermoplastic straight chain polyurethane alone or can be coated in multilayers such as dual costs, triple coats, etc., and using a combination of the above-described thermoplastic straight chain polyurethane and other insulating material or materials.

For maintaining the effect or advantage of this invention it is preferable to use, as the other insulating material, a thermoplastic material such as nylon 6, nylon 6,6, nylon 11, nylon 12, copolymer nylon, a thermoplastic polyester, polyvinyl formal, polyvinyl butyral, etc. Of the above-described other insulating materials nylon 11 and nylon 12 are particularly preferred since they have a low melting point and thus the effect of this invention is scarcely reduced. It is further preferred to use the nylon as the upper layer or uppermost layer of the enameled wire since, in this case, the layer of nylon contributes an improvement in the windability of the enameled wire. When an insulating material having a melting point lower than that of the thermoplastic straight chain polyurethane of this invention is used as the upper layer of the enameled wire, it is possible to use the enameled wire as a self bonding wire.

The enameled wire of this invention can be produced by coating on a conductive wire the wire enamel as shown below and baking. That is:

(A) A wire enamel mainly comprising the thermoplastic straight chain polyurethane of the invention prepared by reacting at least one diisocyanate compound selected from the group consisting of a diisocyanate and a blocked diisocyanate and at least one diol.

(B) A wire enamel mainly comprising the polyurethane polymer prepared from (1) at least one diisocyanate compound selected from the group consisting of a diisocyanate and a blocked diisocyanate, (2) at least one diol, and (3) at least one blocking agent for the isocyanate group.

(C) A wire enamel mainly comprising (i) a polyurethane having a terminal hydroxyl group prepared from at least one diol, at least one diisocyanate compound selected from the group consisting of a diisocyanate and a blocked diisocyanate in an amount less than an equimolar amount to the diol, and, as the case may be, a blocking agent for the isocyanate group and (ii) a polyurethane having a terminal blocked isocyanate group prepared from at least one diisocyanate compound selected from the group consisting of a diisocyanate and a blocked diisocyanate, at least one diol in an amount less than an equimolar amount to the diisocyanate compound, and a blocking agent for the isocyanate group or mainly comprising the polyurethane as defined in (i) and a blocked diisocyanate (iii) or further mainly comprising the polyurethane as defined in (i), the polyrethane as defined in (ii), and the blocked diisocyanate as defined in (iii).

In regard to the ratio of all of the diols and all of the diisocyanate compounds in wire enamels (A), (B), and (C) above, it is preferable from the standpoint of the properties of the enameled wire such as the mechanical strength, the flexibility, the fusing temperature, etc., that the proportion of the diisocyanate compound be about 0.9 to 1.1 moles per mol of the diol, It is more preferable that the proportion of the diisocyanate compound be 0.9 to 1.05 moles per mole of the diol and most preferablly that the proportion be 0.93 to 1.0 mole per mole of the diol. The use of an excessive amount of the diisocyanate compound is undesirable since a cross-linking reaction may occur.

In the case of preparing wire enamel (A), the reaction between the components can be carried out in any order but it is preferable to carry out the reaction of the diisocyanate compounds in the presence of an equimolar amount or excess of the diol component.

In the case of preparing wire enamel (B), the reaction of starting materials (1), (2), and (3) can be carried out in any order (for example, starting materials (1), (2), and (3) can be reacted simultaneously, the reaction of starting material (1) can be carried out gradually in the presence of starting materials (2) and (3), starting material (2) is reacted with starting material (1) and then starting material (3) can be further reacted with the reaction product, starting material (1) is reacted with starting material (3) and then starting material (2) is reacted with the reaction product, or further, starting materials (1), (2), and (3) can be divided into any desired parts and they can be reacted in any desired order but it is preferable to react starting material (1) in the presence of an equimolar amount or excess of starting material (2) or (3) or of starting materials (2) and (3).

Each of wire enamels (A), (B), and (C) can be a solution of the polyurethane polymer itself or can be a solution of the polyurethane polymer containing one or more additives such as other thermoplastic resins, fillers, pigments, dyes, silicone compounds, fluorine compounds, etc. The amount of the additives must be within such a range that does not adversely affect the fundamental properties of the enameled wire of this invention.

In the practice of the preparation of wire enamels (A), (B), and (C), the reaction can be carried out in the absence or presence of a solvent but it is preferable from the standpoint of controlling the reaction to carry out the reaction in the presence of a solvent. It is preferable that the solvent used in this reaction be an organic solvent which is inert to each component under the condition of practicing the reaction or which forms an addition compound having weak bond or a reactive compound and further it is preferable that the solvent is capable of dissolving the polymer formed in the reaction. Examples of suitable solvents include hydrocarbons, halogenated hydrocarbons, phenols, esters, ketones, ethers, substituted amides, substituted sulfoxides, and substituted sulfones and specific examples of such solvents are toluene, xylene, o-dichlorobenzene, phenol, cresolic acid, o-cresol, m-cresol, p-cresol, acetophenone, benzophenone, ethyleneglycol monomethylether acetate, N,N-dimethyl acetamide, N,N-diethylacetamide, N,N-dimethylformamide, N,N-diethylformamide, N-methyl-2-pyrrolidone, N-acetyl-2-pyrrolidone, N-methylcaprolactam, dimethyl sulfoxide, dimethyl sulfone, tetramethylene sulfone, hexamethylphosphoramide, formamide, N-methylformamide, γ-butyrolactam and mixtures of these solvents. Of the above-described solvents, a solvent mainly comprising a phenol or a substituted amide is preferred.

The most preferred solvent is a solvent mainly comprising a substituted amide and a solvent mainly comprising N,N-dimethylacetamide and/or N-methyl-2-pyrrolidone is particularly preferred.

The diisocyanate used for the preparation of wire enamels (A), (B), and (C) is a diisocyanate represented by the general formula

OCN—R—NCO wherein R represents a divalent group having at least 2 carbon atoms. R is usually a residue of an aromatic, an aliphatic, an alicyclic, or a combination thereof such as, for example, an aromatic-aliphatic and preferably the two isocyanate groups are not bonded each other at adjacent positions. Examples of diisocyanate are aliphatic straight chain diisocyanates such as ethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, etc.; aromatic-aliphatic diisocyanates such as p-xylylene diisocyanate, m-xylylene diisocyanate, etc.; aromatic diisocyanates such as m-phenylene diisocyanate, p-phenylene diisocyanate, 2,4-tolylene diisocyanate, 2,6-tolylene diisocyanate, 4,4'-biphenyl diisocyanate, 4,4'-diphenylpropane diisocyanate, 4,4'-diphenylmethane diisocyanate, 3,3'-dimethyl-4,4'-diphenylmethane diisocyanate, 3,3'-cyclodiphenyl diisocyanate, 4,4'-diphenulsulfide diisocyanate, 3,3'-diphenylsulfone diisocyanate, 4,4'-diphenylsulfone diisocyanate, 1,5-naphthalene diisocyanate, 3,3'-dimethyl-4,4'-bisphenyl diisocyanate, 3,3'-dimethoxybiphenyl diisocyanate, 1-isopropyl-2,4-methaphenylene diisocyanate, etc.; and hydrogenated aromatic-aliphatic diisocyanates or hydrogenated aromatic diisocyanates. The diisocyanates can be used individually or as a mixture thereof.

Furthermore, it is preferable from the standpoint of thermostability of the enameled wire of this invention to use an aromatic diisocyanate, in particular 4,4'-diphenylmethane diisocyanate, 4,4'-diphenyl ether diisocyanate, 2,4-tolylene diisocyanate and 2,6-tolylene diisocyanate individually or as a mixture thereof as all of or at least a part of the diisocyanate component.

The blocking agent for the isocyanate group used for preparing wire enamels (B) and (C) is a compound capable of forming an addition product with an isocyanate by reaction with an isocyanate group, with the addition product being stable at normal temperature and reproducing the isocyanate group by dissociation at a high temperature, for example, in the baking process. Examples of blocking agents are compounds having a phenolic hydroxyl group such as phenol, m-cresol, p-cresol, o-cresol, and mixtures thereof; xylenols such as 2,6-dimethylphenol, 4-ethylphenol, 4-tert-butylphenol, 2-butylphenol, 4-n-octylphenol, 4-iso-octylphenol, 2-chlorophenol, 2,6-dichlorophenol, 2-nitrophenol, 4-nitrophenol, and 3-nitrophenol; monohydric alcohols such as methyl alcohol, ethyl alcohol, n-propyl alcohol, isopropyl alcohol, n-butyl alcohol, sec-butyl alcohol, tert-butyl alcohol, n-amyl alcohol, active amyl alcohol, isoamyl alcohol, sec-amyl alcohol, tert-amyl alcohol, octyl alcohol, stearyl alcohol, etc.; cyclohexanone; acetoacetic acid ester; hydroxyalkylcarbamic acid aryl esters; hydroethylcarbamic acid cresyl esters; diethyl malonate; mercaptans such as 2-mercaptobenzothiazole, 2-merceptothiazoline, dodecylmercaptan, ethyl-2-mercaptothiazole, p-naphthylmercaptan, α-naphthylmercaptan, methyl mercaptan, butyl mercaptan, etc.; lactams such as α-pyrrolidone, ε-caprolactam, Δ-valerolactam, γ-butyrolactam, β-propiolactam, etc.; imides such as succinimide, phthalimide, naphthalinimide, glutaminimide, dimethylphenylcarbinol etc.; secondary amines such as o-ditolylamine, m-ditolylamine, p-ditolylamine, N-phenyltoluidine, phenyl-α-naphthylamine, carbazole, diphenylamine, etc.; mono-α-phenylethyl phenol; di-α-phenylethyl phenol; tri-α-phenylethyl phenol; carbachol; thymol; methyldiphenyl carbinol; triphenyl carbinol; 1-nitro-tert-butylcarbinol; 1-chloro-tert-butylcarbinol; triphenylsilanol; 2,2'-dinitrodiphenylamine; 2,2'-dichlorodiphenylamine; ethyl-n-butyl malonate; ethylbenzyl malonate; acetylacetone; acetonylacetone; benzimidazole; 1-phenyl-3-methyl-6-pyrazolone; etc. Of these compounds, the use of the compounds having a phenolic hydroxyl group is preferred.

The blocked diisocyanate used for preparing wire enamels (A), (B), and (C) is the addition product of the above-described diisocyanate and a blocking agent for the isocyanate group and the addition product is stable at normal temperature but is diisociated regenerating the isocyanate group in the reaction under high temperature conditions or at a high temperature as in the baking process, etc.

It is preferable from the standpoint of the thermostability of the enambled wire of this invention to use an aromatic diisocyanate, in particular 4,4'-diphenylmethane diisocyanate, 4,4'-diphenylether diisocyanate, 2,4-tolylene diisocyanate, and 2,6-tolylene diisocyanate individually or as a mixture thereof as all or at least a part of the diisocyanate component of the blocked diisocyanate. A particularly preferred blocking agent for the isocyanate group used for producing the blocked diisocyanate is a compound having a phenolic hydroxyl group.

The diisocyanate compounds used for producing wire enamels (A), (B), and (C) are the above-described diisocyanates and the above-described blocked diisocyanates and further diisothiocyanates can also be used for the purpose.

The diol used for preparing wire enamels (A), (B) and (C) is a diol represented by the general formula

HO—R'—OH wherein R' is a divalent group having at least 2 carbon atoms. R' is usually a residue of an aromatic, an aliphatic, alicyclic, or a combination thereof. Examples of such diols are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,2-propanediol, 1,2-butanediol, 1,3-butanediol, 2,3-butanediol, 1,4-pentanediol, 2,3-pentanediol, 2,4-pentanediol, 1,5-hexanediol, 2,3-hexanediol, 2,4-hexanediol, 2,5-hexanediol, 3,4-hexanediol, 2-methyl-butanediol-(1,2), 2-methyl-butanediol-(1,3), 2-methyl-butanediol-(1,4), 2-methyl-butanediol-(2,3), 2-methyl-butanediol-(2,4), 2-methyl-butanediol-(3,4), 2,2-dimethylpropanediol-(1,3), 2-methylpentanediol-(2,5), 2-methylpentanediol-(2,4), 2-methylpentanediol-(1,3), 3-methylpentanediol-(2,4), 2,2-dimethyl-butanediol-(1,4), 2,2-dimethylbutanediol-(1,3), diethylene glycol, triethylene glycol, tetraethylene glycol, polypropylene glycol, 1,4-cyclohexanediol, 1,4-cyclohexanedimethanol, 1,4-cyclohexanediethanol, hydrogenated bisphenol A, and bisphenol A. These diols can be used individually or as a mixture thereof. Furthermore, a prepolymer of a diol and a diisocyanate having a terminal hydroxyl group can be used as the diol component.

In addition to the above-described diols, there are also polyether glycols and polyester glycols such as polyethylene glycol and polypropylene glycol and a small amount of these polyether and polyester glycols can be used together with the above-described diols but since the addition of these glycols reduces the heat distortion temperature of the enameled wire as compared with the fusing temperature and further generates smoke greatly at fusing, the amount of the glycols must be in a range which does not damage the fundamental properties of the enameled wire of this invention.

Also, a part of the diol component can be replaced with a small amount of a di-functional compound which can react with the isocyanate group, such as, for example, a dicarboxylic acid, a diamine, an amino alcohol, etc. However, in this case also, the amount of the compound must be in a range which does not adversely influence the smoking property and the fusing temperature.

Of the aforesaid diol compounds, it is preferable for the properties of the enameled wire of this invention, in particular for providing both flexibility and thermal stability to the enameled wire, to use one or more aliphatic straight chain diols represented by the general formula $HO—(CH_2)_n—OH$ wherein n is an integer of at least 2 as all or a part of the diol component.

By using a blocking agent for blocking the isocyanate group in addition to the diol and diisocyanate in the case of producing the polyurethane polymer used in this invention, the viscosity of the polymer solution can be greatly reduced and also the concentration of the polymer solution can be greatly increased. Therefore, the amount of the solvent per unit weight of the polymer can be greatly reduced. Moreover, when the polymer solution is applied to a fine conductive wire for preparing the enameled wire, the coatability of the polymer solution decreases greatly, which results in greatly increasing the cost of the enameled wire if the viscosity of the polymer solution is high and the concentration of the polymer solution is low. Therefore, the use of the blocking agent is quite valuable for practical purposes since an enameled wire having the same properties as an enameled wire produced using a solution of a high molecular weight polymer prepared from a diol and a diisocyanate only is obtained using the polymer solution having a high concentration and a low viscosity.

The reaction of producing the polyurethane polymer used in this invention can be accelerated by using an appropriate catalyst. Examples of the catalyst are those usually used for reactions of isocyanates, such as, for example, boron fluoride; addition products of boron fluoride; a mineral acid; a carboxylic acid; zinc chloride; tertiary amines such as triethylamine, N-alkylmorpholine, triethylenediamine, 1,8-diaza-bicyclo(5,4,0)undecene-7 (including the acid addition products thereof), etc.; trialkylphosphines; metal salts such as potassium acetate, zinc octoate, dibutyltin laurate, lithium linoleate, sodium oleate, sodium methoxide, and potassium ethoxide; and heavy metal salts such as cobalt acetate, cobalt naphthenate, etc. Furthermore, other examples of catalysts which can be used for this purpose are titanium tetraalkoxides such as titanium isopropoxide, titanium tetrabutoxide, titanium tetraphenolate, etc.; chelate compounds of these titanium tetraalkoxides; tetraalkyltitanium acylates; and titanium bischelate compounds. Of these catalysts, tertiary amines, tin compounds and titanium compounds are preferred and further titanium catalysts and 1,8-diazabicyclo(5,4,0)undecene-7 (including the acid addition products thereof) are particularly preferred.

In each of the examples and the reference example shown below, the enameled wire was prepared by coating an insulating coating composition on a conductive wire in a conventional manner and baking. The fusing temperature was measured in the following manner. That is, when the diameter of the core wire of the enameled wire was 0.3 mm, a sample was prepared by winding the enameled wire 150 turns around a plastic bobbin having a drum diameter of 18 mm, a collar diameter of 40 mm, and a drum length of 9 mm, placing a chromel-alumel thermocouple having a diameter of 0.3 mm on the wound enameled wire at the middle, and winding further the enameled wire 150 turns around the assembly. When the core diameter of the enameled wire was 0.2 mm or 0.13 mm, a sample was prepared by winding the enameled wire 200 turns around the bobbin as described above placing a chromel-alumel thermocouple having a diameter of 0.3 mm on the wound wire at the middle, and then winding the enameled wire 150 turns around the assembly. The sample was heated by passing a large electric current through the enameled wire of the sample and the temperature at which the enameled wire was fused was measured using the inserted thermocouple.

The other properties of the enameled wire, such as the cut-thru temperature, etc., were tested according to the methods of JIS C-3003. Also, the reduced specific viscosity of the resin was measured at 30° C. after dissolving 0.5 g of the resin in 100 ml of N,N-dimethylacetamide.

EXAMPLE 1

When a mixture of 591.0 g (5.0 moles) of 1,6-hexanediol 1251.3 g (5.0 moles) of diphenylmethane-4,4'-diisocyanate, and 2760 g of N-methyl-2-pyrrolidone was stirred in a reaction vessel, the temperature of the reaction system began to increase after a time and then the temperature increased to about 85° C. due to the heat of reaction, whereby the reaction mixture became viscous. Then, by heating the mixture on an oil bath, the temperature of the reaction system was increased to 120° C. over a period of one hour and the reaction was further carried out for 1.5 hours at the same temperature. After the reaction was over, the reaction mixture was diluted with 2398 g of N-methyl-2-pyrrolidone and 2210 g of solvent naphtha to provide a transparent polymer solution. The viscosity of the solution was 2200 cps. at 30° C. and the reduced specific viscosity of the polymer was 0.86. An enameled wire was prepared by coating the polymer solution on a copper wire having a diameter of 0.3 mm and baking. The properties of the enameled wire are shown in Table 1.

EXAMPLE 2

The viscosity of the polymer solution obtained in Example 1 was reduced to 200 cps by adding further N-methyl-2-pyrrolidone and solvent naphtha to the polymer solution and an enameled wire was prepared by coating the polymer solution on a copper wire of 0.2 mm diameter and baking. The properties of the enameled wire are shown in Table 1.

EXAMPLE 3

When a mixture was 236.4 g (2.0 moles) of 1,6-hexanediol, 490.5 g (1.96 moles) of diphenylmethane-4,4'-diisocyanate, and 790 g of N-methyl-2-pyrrolidone was stirred in a reaction vessel, the temperature of the reaction system began to increase after a time and the temperature increased to about 95° C., due to the heat of reaction, whereby the reaction system became viscous. Then, by heating the mixture on an oil bath, the temperature of the reaction system was increased to 120° C. over a period of 1.5 hours and then the reaction was carried out for 2 hours at the same temperature. After the reaction was over, the reaction mixture was diluted with 1510 g of N-methyl-2-pyrrolidone and 390 g of xylene to provide a transparent polymer solution. The viscosity of the polymer solution was 1700 cps. at 30° C. and the reduced specific viscosity of the polymer was 0.61. The polymer solution was diluted with N-methyl-2-pyrrolidone and solvent naphtha until the viscosity thereof became 200 cps. and the solution was coated on a copper wire of 0.2 mm diameter and baked to provide an enameled wire. The properties of the enameled wire are shown in Table 1.

EXAMPLE 4

When a mixture of 236.4 g (2.0 moles) of 1,6-hexanediol, 475.5 g (1.9 moles) of diphenylmethane-4,4'-diisocyanate, and 1070 g of dimethylacetamide was stirred in a reaction vessel, the temperature of the reaction system began to increase after a time and the temperature increased to about 85° C. due to the heat of reaction, whereby the reaction system became viscous. Thereafter, by heating the mixture of an oil bath, the temperature of the reaction system was increased to 123° C. over a period of one hour and then the reaction was further carried out for 2 hours at the same temperature. After the reaction was over, the reaction mixture was diluted with 174 g of N-methyl-2-pyrrolidone and 533 g of xylene to provide a transparent polymer solution. The viscosity of the polymer solution was 750 cps. at 30° C. and the reduced specific viscosity of the polymer was 0.40. The polymer solution was diluted with N-methyl-2-pyrrolidone and xylene until the viscosity became 200 cps. at 30° C. and the solution was coated on a copper wire of 0.2 mm diameter and baked to provide an enameled wire. The properties of the enameled wire are shown in Table 1.

EXAMPLE 5

When a mixture of 236.4 g (2.0 moles) of 1,6-hexanediol, 470.5 g (1.88 moles) of diphenylmethane-4,4'-diisocyanate, and 1060 g of N-methyl-2-pyrrolidone was stirred in a reaction vessel, the temperature of the reaction system began to increase after a time and then the temperature increased to about 80° C. due to the heat of reaction, whereby the reaction system became viscous. Thereafter, by heating the mixture on an oil bath, the temperature of the reaction system was increased to 120° C. over a period of one hour and then the reaction was further carried out for 1.5 hours at the same temperature. Then, the reaction mixture obtained was diluted with 590 g of N-methyl-2-pyrrolidone to provide a transparent polymer solution. The reduced specific viscosity of the polymer was 0.36. The polymer solution was diluted with N-methyl-2-pyrrolidone until the viscosity became 200 cps. at 30° C. The polymer solution was coated on a copper wire of 0.2 mm diameter and baked to provide an enameled wire. The properties of the enameled wire are shown in Table 1.

EXAMPLE 6

When a mixture of 236.4 g (2.0 moles) of 1,6-hexanediol, 465.5 g (1.86 moles) of diphenylmethane-4,4'-diisocyanate, and 1053 g of N-methyl-2-pyrrolidone was stirred in a reaction vessel, the temperature of the reaction system began to increase after a time and then the temperature increased to about 80° C. due to the heat of reaction, whereby the reaction system became viscous. Thereafter, by heating the mixture on an oil bath, the temperature of the reaction system was increased to 120° C. over a period of one hour and then the reaction was further carried out for 1.5 hours at the same temperature. After the reaction was over, the reaction mixture was diluted with 590 g of N-methyl-2-pyrrolidone to provide a transparent polymer solution. The reduced specific viscosity of the polymer was 0.34. The polymer solution was diluted with N-methyl-2-pyrrolidone until the viscosity became 200 cps. at 30° C.

and the solution was coated on a copper wire of 0.2 mm diameter and baked to provide an enameled wire. The properties of the enameled wire are shown in Table 1.

EXAMPLE 7

When a mixture of 425.5 g (3.6 moles) of 1,6-hexanediol, 81.1 g (0.9 moles) of 1,4-butanediol, 1103.6 g (4.41 moles) of diphenylmethane-4,4'-diisocyanate, and 3735 g of N-methyl-2-pyrrolidone was stirred in a reaction vessel, the temperature of the reaction system began to increase after a time, and then the temperature increased to about 70° C. due to the heat of reaction, whereby the reaction system became viscous. Thereafter, by heating the mixture of an oil bath, the temperature of the reaction system was increased to 120° C. over a period of one hour and then the reaction was further carried out for 2 hours at the same temperature. After the reaction was over, the reaction mixture was diluted with 1365 g of xylene to provide a transparent polymer solution. The viscosity of the polymer solution was 1300 cps at 30° C. and the reduced specific viscosity of the polymer was 0.60. After diluting the polymer solution with N-methyl-2-pyrrolidone until the viscosity of the solution became 200 cps. at 30° C., the solution was coated on a copper wire of 0.2 mm diameter and baked to provide an enameled wire. The properties of the enameled wire are shown in Table 1.

EXAMPLE 8

When a mixture of 319.1 g (2.7 moles) of 1,6-hexanediol, 162.2 g (1.8 moles) of 1,4-butanediol, 1103.6 g (4.41 moles) of diphenylmethane-4,4'-diisocyanate, and 2380 g of N-methyl-2-pyrrolidone was stirred in a reaction vessel, the temperature of the reaction system began to increase after a time and then the temperature increased to about 85° C. due to the heat of reaction, whereby the reaction system became viscous. Thereafter, by heating the mixture on an ail bath, the temperature of the reaction system was increased to 120° C. and then the reaction was further carried out for 1.5 hours at the same temperature. Thereafter, the reaction mixture was diluted with 560 g of N-methyl-2-pyrrolidone and 1260 g of xylene to provide a transparent polymer solution. The viscosity of the polymer solution was 2000 cps. at 30° C. and the reduced specific viscosity of the polymer was 0.53. After diluting the polymer solution with N-methyl-2-pyrrolidone until the viscosity became 200 cps. at 30° C., the solution was coated on a copper wire of 0.2 mm diameter and baked to provide an enameled wire. The properties of the enameled wire are shown in Table 1.

EXAMPLE 9

When a mixture of 236.4 g (2.0 moles) of 1,6-hexanediol, 392.4 g (1.568 moles) of diphenylmethane-4,4'-diisocyanate, 68.3 g (0.392 mole) of tolylene diisocyanates (a 80:20 mixture of 2,4-tolylene diisocyanate and 2,6-tolylene diisocyanate), and 1050 g of N-methyl-2-pyrrolidone was stirred in a reaction vessel, the temperature of the reaction system began to increase and then the temperature increased to about 73° C. due to the heat of reaction, whereby the reaction system became viscous. Thereafter, by heating the mixture of an oil bath, the temperature of the reaction system was increased to 120° C. and then the reaction was further carried out for two hours at the same temperature. After the reaction was over, the reaction mixture was diluted with 90 g of N-methyl-2-pyrrolidone and 490 g of xylene to provide a transparent polymer solution. The viscosity of the polymer solution was 1900 cps. at 30° C. and the reduced specific viscosity of the polymer was 0.62. After diluting the polymer solution with N,N-dimethylacetamide until the viscosity became 200 cps. at 30° C., the solution was coated on a copper wire of 0.2 mm diameter and baked to provide an enameled wire. The properties of the enameled wire are shown in Table 1.

EXAMPLE 10

When a mixture of 236.4 g (2.0 moles) of 1,6-hexanediol, 343.3 g (1.372 moles) of diphenylmethane-4,4'-diisocyanate, 102.4 g (0.588 mole) of tolylene diisocyanates (a 80:20 mixture of 2,4-tolylene diisocyanate and 2,6-tolylene diisocyanate), and 1020 g of N-methyl-2-pyrrolidone was stirred in a reaction vessel, the temperature of the reaction system began to increase and then the temperature increased due to the heat of reaction to about 88° C., whereby the reaction system became viscous. Thereafter, by heating the mixture of an oil bath, the temperature of the reaction system was increased to 120° C. over a period of 1.5 hours and then the reaction was carried out for further 1.5 hours at the same temperature. After the reaction was over, the reaction mixture was diluted with 412 g of N-methyl-2-pyrrolidone and 614 g of xylene to provide a transparent polymer solution. The reduced specific viscosity of the polymer was 0.55. After diluting the polymer solution with N,N-dimethylacetamide until the viscosity became 200 cps. at 30° C., the solution was coated on a copper wire of 0.2 mm diameter and baked to provide an enameled wire. The properties of the enameled wire are shown in Table 1.

EXAMPLE 11

When a mixture of 236.4 g (2.0 moles) of 1,6-hexanediol, 392.4 g (1.568 moles) of diphenylmethane-4,4'-diisocyanate, and 1040 g of N-methyl-2-pyrrolidone was stirred in a reaction vessel, the temperature of the reaction system began to increase and then increased to about 80° C. due to the heat of reaction. Then, after adding 65.9 g (0.392 mole) of hexamethylene diisocyanate and 0.2 g of dibutylin dilaurate to the reaction system, the temperature of the reaction system was increased to 120° C. over a period of 1 hour by heating an oil bath and then the reaction was carried out for 2 hours at the same temperature. After the reaction was over, the reaction mixture was diluted with 90 g of N-methyl-2-pyrrolidone and 490 g of xylene to provide a transparent polymer solution. The reduced specific viscosity of the polymer was 0.59 and the viscosity of the polymer solution was 1700 cps. After diluting the polymer solution with N-methyl-2-pyrrolidone until the viscosity became 200 cps. at 30° C., the solution was coated on a copper wire of 0.2 mm diameter and baked to provide an enameled wire. The properties of the enameled wire are shown in Table 1.

EXAMPLE 12

When a mixture of 118.2 g (1.0 mole) of 1,6-hexanediol, 247.2 g (0.98 mole) of diphenylether-4,4'-diisocyanate, 597 g of N,N-dimethylacetamide and 256 g of xylene was stirred in a reaction vessel, the temperature began to increase after a time and then the temperature increased to about 80° C. due to the heat of reaction, whereby the reaction system became viscous. Thereafter, by heating the mixture on an oil bath, the temperature of the reaction system was increased to 120° C. over a period of 1.5 hours and then the reaction was carried out at the same temperature for 2 hours. After the reaction was over, the reaction mixture was diluted with 298 g of N,N-dimethylacetamide and 128 g of xylene to provide a transparent polymer solution. The reduced specific viscosity of the polymer was 0.55. The polymer solution was coated on a copper wire of 0.3 mm diameter and baked to provide an enameled wire. The properties of the enameled wire are shown in Table 1.

EXAMPLE 13

The polymer solution obtained in Example 12 was diluted with N,N-dimethylacetamide until the viscosity became 200 cps at 30° C. and then the solution was coated on a copper wire of 0.2 mm diameter and baked to provide an enameled wire. The properties of the enameled wire are shown in Table 1.

EXAMPLE 14

When a mixture of 180.2 g (2.0 moles) of 1,4-butanediol, 500.5 g (2.0 moles) of diphenylmethane-4,4'-diisocyanate, and 1021 g of N-methyl-2-pyrrolidone was stirred in a reaction vessel, the temperature of the reaction system began to increase and then the temperature increased to about 88° C. due to the heat of reaction, whereby the reaction system became viscous. Thereafter, by heating the mixture on an oil bath, the temperature of the reaction system was increased to 120° C. over a period of 1.5 hours and then the reaction was further carried out for 1 hour at the same temperature. After the reaction was over, the reaction mixture was diluted with 1021 g of N-methyl-2-pyrrolidone to provide a transparent polymer solution. The reduced specific viscosity of the polymer was 0.96. After diluting the polymer solution with N-methyl-2-pyrrolidone and xylene until the viscosity became 200 cps. at 30° C., the solution was coated on a copper wire of 0.2 mm diameter and baked to provide an enameled wire. The properties of the enameled wire are shown in Table 1.

EXAMPLE 15

When a mixture of 118.2 g (1.0 mole) of 1,6-hexanediol, 250.2 g (1.0 mole) of diphenylmethane-4,4'-diisocyanate, 69.2 g (0.64 mole) of cresol, and 552 g of N-methyl-2-pyrrolidone was stirred in a reaction vessel, an exothermic reaction occurred immediately and the temperature of the reaction system increased to 73° C. Then, the reaction was carried out for 1 hour at 100° C. and the reaction mixture obtained was cooled to provide a transparent polymer solution. The viscosity of the polymer solution was 850 cps. at 27° C. and the reduced specific viscosity of the polymer was 0.15. The polymer solution was coated on a copper wire of 0.2 mm diameter and baked to provide an enameled wire. The properties of the enameled wire are shown in Table 2. Also, the polymer solution was coated on a copper wire of 0.3 mm diameter and baked to provide an enameled wire having a film thickness of 0.014 mm. The number of repeated scrapes which the enameled wire could withstand at a load of 220 g was 28 time and further the enameled wire passed an elongation test of 15% after heat aging of 6 hours at 170° C.

EXAMPLE 16

When a mixture of 118.2 g (1.0 mole) of 1,6-hexanediol, 242.4 g (0.97 mole) of diphenylmethane-4,4'- diisocyanate, 69.2 g (0.64 mole) of cresol, and 540 g of N-methyl-2-pyrrolidone was stirred in a reaction vessel, an exothermic reaction occurred immediately and the temperature of the reaction system increased to 76° C. Thereafter, the reaction was carried out for 30 minutes at 100° C. and after the reaction was over, the reaction mixture was cooled. The polymer solution obtained was transparent, the viscosity of the polymer solution was 540 cps at 28° C., and the reduced specific viscosity of the polymer was 0.14. The polymer solution was coated on a copper wire of 0.2 mm diameter and baked to provide an enameled wire. The properties of the enameled wire are shown in Table 2.

EXAMPLE 17

When a mixture of 118.2 g (1.0 mole) of 1,6-hexanediol, 250.2 g (1.0 mole) of diphenylmethane-4,4'-diisocyanate, 21.6 g (0.2 mole) of cresol, and 552 g of N-methyl-2-pyrrolidone was stirred in a reaction vessel, an exothermic reaction occurred immediately and the temperature of the reaction system increased to 72° C. The temperature of the reaction system was further increased to 100° C. by heating and then the reaction was carried out for 1 hour at the same temperature to provide a transparent polymer solution. The viscosity of the polymer solution was 4270 cps at 26° C. After diluting the polymer solution with N-methyl-2-pyrrolidone until the viscosity became 200 cps. at 30° C., the solution was coated on a copper wire of 0.2 mm diameter and baked to provide an enameled wire. The properties of the enameled wire are shown in Table 2.

EXAMPLE 18

When a mixture of 118.2 g (1.0 mole) of 1,6-hexanediol, 250.2 g (1.0 mole) of diphenylmethane-4,4'-diisocyanate, 43.2 g (0.4 mole) of cresol, and 552 g of N-methyl-2-pyrrolidone was stirred in a reaction vessel, the temperature of the reaction system increased immediately. The temperature of the reaction system was further increased to 103° C. by heating and the reaction was carried out for 30 minutes at the same temperature to provide a transparent polymer solution. The viscosity of the polymer solution was 2450 cps at 27° C. After diluting the polymer solution with N-methyl-2-pyrrolidone until the viscosity became 200 cps. at 30° C., the solution was coated on a copper wire of 0.2 mm diameter and baked to provide an enameled wire. The properties of the enameled wire are shown in Table 2.

EXAMPLE 19

When a mixture of 118.2 g (1.0 mole) of 1,6-hexanediol, 250.2 g (1.0 mole) of diphenylmethane-4,4'-diisocyanate, 69.2 g (0.64 mole) of cresol, and 552 g of N,N-dimethylacetamide was stirred in a reaction vessel, an exothermic reaction occurred immediately and then the reaction was carried out for 30 minutes at 100° C. under heating. The polymer solution obtained was transparent and the viscosity of the polymer solution was 1000 cps at 26° C. After diluting the polymer solution with N,N-dimethylacetamide until the viscosity became 200 cps. at 30° C., the solution was coated on a copper wire of 0.2 mm diameter and baked to provide an enameled wire. The properties of the enameled wire are shown in Table 2.

EXAMPLE 20

When a mixture of 118.2 g (1.0 mole) of 1,6-hexanediol, 200.2 g (0.8 mole) of diphenylmethane-4,4'- diisocyanate, 34.8 g (0.2 mole) of tolylene diisocyanates (a 80:20 mixture of 2,4-tolylene diisocyanate and 2,6-tolylene diisocyanate), and 532 g of N-methyl-2-pyrrolidone was stirred in a reaction vessel, the temperature of the reaction system increased and the temperature increased further to about 80° C. due to the heat of reaction, whereby the reaction mixture became viscous. Then, by heating the mixture on an oil bath, the temperature of the reaction system was increased to 100° C. over a period of 0.5 hour and the reaction was carried out for 0.75 hours at the temperature to provide a transparent polymer solution. The viscosity of the polymer solution was 1270 cps at 25° C. After diluting the polymer solution with N-methyl-2-pyrrolidone until the viscosity became 200 cps at 30° C., the solution was coated on a copper wire of 0.2 mm diameter and baked to provide an enameled wire. The properties of the enameled wire are shown in Table 2.

EXAMPLE 21

When a mixture of 118.2 g (1.0 mole) of 1,6-hexanediol, 125.1 g (0.5 mole) of diphenylmethane-4,4'-diisocyanate, 87.0 g (0.5 mole) of tolylene diisocyanates (a 80:20 by weight mixture of 2,4-tolylene diisocyanate and 2,6-tolylene diisocyanate), 64.9 g (0.6 mole) of cresol, and 496 g of N-methyl-2-pyrrolidone was stirred in a reaction vessel, the temperature of the reaction system increased and the temperature reached about 80° C. due to the heat of reaction, whereby the reaction mixture became viscous. Thereafter, by heating the mixture on an oil bath, the temperature of the reaction system was increased to 100° C. over a period of 0.5 hour and then the reaction was further carried out for 0.75 hour at the same temperature to provide a transparent polymer solution. The viscosity of the polymer solution was 1160 cps at 26° C. After diluting the polymer solution with N-methyl-2-pyrrolidone until the viscosity became 200 cps at 30° C., the solution was coated on a copper wire of 0.2 mm diameter and baked to provide an enameled wire. The properties of the enameled wire are shown in Table 2.

EXAMPLE 22

When a mixture of 90.1 g (1.0 mole) of 1,4-butanediol, 250.2 g (1.0 mole) of diphenylmethane-4,4'-diisocyanate, 64.9 g (0.6 mole) of cresol, and 510 g of N-methyl-2-pyrrolidone was stirred in a reaction vessel, the temperature of the reaction system began to increase and then the temperature increased to about 80° C. due to the heat of reaction, whereby the reaction mixture became viscous. Thereafter, by heating the reaction mixture on an oil bath, the temperature of the reaction system was increased to 100° C. over a period of 0.5 hour and then the reaction was carried out for 0.75 hours at the same temperature to provide a transparent polymer solution. The viscosity of the polymer solution was 1230 cps at 25° C. After diluting the polymer solution with N-methyl-2-pyrrolidone until the viscosity became 200 cps at 30° C., the solution was coated on a copper wire of 0.2 mm diameter and baked to provide an enameled wire. The properties of the enameled wire are shown in Table 2. Also, the solution of the polymer was coated on a copper wire of 0.3 mm diameter and baked to provide an enameled wire having a film thickness of 0.015 mm. The number of repeated scrapes which the enameled wire could withstand at a load of 220 g was 27 times and the enameled wire passed an elongation test of 15% after heat aging for 6 hours at 170° C.

EXAMPLE 23

A mixture of 250.2 g (1.0 mole) of diphenylmethane-4,4'-diisocyanate, 21.6 g (0.15 mole) of cresol, and 510 g of N-methyl-2-pyrrolidone was reacted for 30 minutes at about 60° C. in a reaction vessel. Then, after adding to the reaction mixture 90.1 g (1.0 mole) of 1,4-butanediol, the temperature was increased to 100° C. over a period of 30 minutes and the reaction was further carried out for 1 hour at 100° C. to provide a transparent polymer solution. The viscosity of the polymer solution was 2150 cps at 27° C. After diluting the polymer solution with N-methyl-2-pyrrolidone until the viscosity became 200 cps at 30° C., the solution was coated on a copper wire of 0.2 mm diameter and baked. The properties of the enameled wire thus obtained are shown in Table 2.

EXAMPLE 24

When a mixture of 118.2 g (1.0 mole) of 1,6-hexanediol, 175.2 g (0.7 mole) of diphenylmethane-4,4'-diisocyanate, and 293.4 of N-methyl-2-pyrrolidone was stirred in a reaction vessel, the temperature of the reaction system began to increase after a time and then the temperature increased further to about 63° C. Thereafter, the temperature of the reaction system was increased to 120° C. by heating and the reaction was carried out for 1 hour at the same temperature to provide polymer solution A.

Then, when a mixture of 82.7 g (0.7 mole) of 1,6-hexanediol, 250.3 g (1.0 mole) of diphenylmethane-4,4'-diisocyanate, and 500 g of N-methyl-2-pyrrolidone was stirred in a reaction vessel, the temperature of the reaction system began to increase after a time to 65° C. The reaction system was heated and when 70.3 g (0.65 mole) of cresol was added to the reaction system at 100° C. 30 minutes after the start of the reaction, the temperature of the reaction system increased to about 110° C. By carrying out further the reaction at the same temperature for 30 minutes, polymer solution B was obtained.

Then, polymer solution A was mixed with polymer solution B to provide a wire enamel and after diluting the wire enamel with N-methyl-2-pyrrolidone until the viscosity thereof became 200 cps. at 30° C., the diluted solution was coated on a copper wire of 0.2 mm diameter and baked to provide an enameled wire. The properties of the enameled wire are shown in Table 3.

EXAMPLE 25

When a mixture of 90.1 g (1.0 mole) of 1,4-butanediol, 200.2 g (0.8 mole) of diphenylmethane-4,4'-diisocyanate, and 290.3 g of N-methyl-2-pyrrolidone was stirred in a reaction vessel, the temperature of the reaction system began to increase after a time and then the temperature increased to about 65° C. The reaction system was heated to 120° C. and the reaction was carried out for 1 hour at the same temperature to provide polymer solution A.

Then, when a mixture of 72.1 g (0.8 mole) of 1,4-butanediol, 250.3 g (1.0 mole) of diphenylmethane-4,4'-diisocyanate, and 484 g of N-methyl-2-pyrrolidone was stirred in a reaction vessel, an exothermic reaction occurred after a time and the temperature of the reaction system increased to about 70° C. When 48.7 g (0.45 mole) of cresol was added to the reaction mixture, the temperature of the reaction system increased further.

The temperature was further increased by heating to 120° C. and the reaction was further carried out for 30 minutes at 120° C. to provide polymer solution B.

Then, polymer solution A was mixed with polymer solution B to provide a wire enamel and after diluting the wire enamel with N-methyl-2-pyrrolidone until the viscosity thereof became 200 cps. at 30° C., the solution was coated on a copper wire of 0.2 mm diameter and baked to provide an enameled wire. The properties of the enameled wire are shown in Table 3.

EXAMPLE 26

When a mixture of 90.1 g (1.0 mole) of 1,4-butanediol, 200 g (0.8 mole) of diphenylmethane-4,4'-diisocyanate, and 290.3 g of N-methyl-2-pyrrolidone was stirred in a reaction vessel, the temperature of the reaction system began to increase after a time and then the temperature increased to about 65° C. The reaction system was further heated to 120° C. and then the reaction was carried out for 1 hour at the same temperature to provide polymer solution A.

Then, when a mixture of 94.6 g (0.8 mole) of 1,6-hexanediol, 242.7 g (0.97 mole) of diphenylmethane-4,4'-diisocyanate, 43.3 g (0.4 mole) of cresol, and 517 g of N-methyl-2-pyrrolidone was stirred in a reaction vessel, the temperature of the reaction system began to increase after a time and it reached about 80° C. The temperature of the reaction system was increased to 120° C. by heating and then the reaction was carried out for 30 minutes at that temperature to provide polymer solution B.

Then, polymer solution A was mixed with polymer solution B to provide a wire enamel and after diluting the wire enamel with N-methyl-2-pyrrolidone until the viscosity thereof became 200 cps, the diluted solution was coated on a copper wire of 0.2 mm diameter and baked to provide an enameled wire. The properties of the enameled wire are shown in Table 3.

EXAMPLE 27

When a mixture of 118.2 g (1.0 mole) of 1,6-hexanediol, 175.2 g (0.7 mole) of diphenylmethane-4,4'-diisocyanate, and 294 g of N-methyl-2-pyrrolidone was stirred in a reaction vessel, the temperature of the reaction system began to increase after a time and then the temperature further increased to about 65° C. The temperature of the system was increased to 120° C. by heating and the reaction was carried out for 1 hour at the same temperature to provide polymer solution A.

Then, when a mixture of 82.7 g (0.7 mole) of 1,6-hexanediol, 174.2 g (1.0 mole) of tolylene diisocyanates (a 8:2 by weight mixture of 2,4-tolylene diisocyanate and 2,6-tolylene diisocyanate) and 385 g of N-methyl-2-pyrrolidone was stirred in a reaction vessel, an exothermic reaction occurred after a time and the temperature of the reaction system increased to about 70° C. Then, after adding to the reaction mixture 64.9 g (0.6 mole) of cresol, the temperature of the mixture was increased to 170° C. by heating and the reaction was carried out for 30 minutes at the same temperature to provide polymer solution B.

Then, polymer solution A was mixed with polymer solution B to provide a wire enamel and after diluting the wire enamel with N-methyl-2-pyrrolidone until the viscosity became 200 cps, the solution was coated on a copper wire of 0.2 mm diameter and baked. The properties of the enameled wire thus obtained are shown in Table 3.

EXAMPLE 28

When a mixture of 90.1 g (1.0 mole) of 1,4-butanediol, 200.2 g (0.8 mole) of diphenylmethane-4,4'-diisocyanate, 5.4 g (0.05 mole) of cresol, and 290.3 g of N-methyl-2-pyrrolidone was stirred in a reaction vessel, an exothermic reaction occurred after a time and the temperature of the reaction system increased to about 65° C. The temperature of the reaction system was increased to 120° C. by heating and the reaction was carried out for 1 hour at the same temperature to provide polymer solution A.

Then, when a mixture of 72.1 g (0.8 mole) of 1,4-butanediol, 250.3 g (1.0 mole) of diphenylmethane-4,4'-diisocyanate, and 484 g of N-methyl-2-pyrrolidone was stirred in a reaction vessel, the temperature of the reaction system began to increase after a time and then the temperature increased to about 70° C. When 43.3 g (0.4 mole) of cresol was added to the reaction mixture, an exothermic reaction occurred. The temperature of the mixture was increased to 120° C. by heating and the reaction was carried out further for 30 minutes at the same temperature to provide polymer solution B.

Then, polymer solution A was mixed with polymer solution B to provide a wire enamel and after diluting the wire enamel with N-methyl-2-pyrrolidone until the viscosity thereof became 200 cps at 30° C., the diluted solution was coated on a copper wire of 0.2 mm diameter and baked to provide an enameled wire. The properties of the enameled wire are shown in Table 3.

EXAMPLE 29

When a mixture of 90.1 g (1.0 mole) of 1,4-butanediol, 200.2 g (0.8 mole) of diphenylmethane-4,4'-diisocyanate, and 290.3 g of N-methyl-2-pyrrolidone was stirred in a reaction vessel, the temperature of the reaction system began to increase after a time and then the temperature increased further to about 65° C. The temperature of the reaction system was increased to 120° C. by heating and the reaction was carried out for 1 hour at the same temperature to provide polymer solution A.

Then, when a mixture of 72.1 g (0.8 mole) of 1,4-butanediol, 225.2 g (0.9 mole) of diphenylmethane-4,4'-diisocyanate, and 484 g of N-methyl-2-pyrrolidone was stirred in a reaction vessel, the temperature of the reaction system began to increase and then the temperature increased further to about 70° C. Then, when 21.6 g (0.2 mole) of cresol was added to the reaction mixture, an exothermic reaction occurred and after increasing the temperature of the reaction system to 120° C. by heating, the reaction was carried out for 30 minutes at the same temperature. After cooling the reaction product, a blocked isocyanate prepared by blocking the isocyanate group of diphenylmethane-4,4'-diisocyanate with cresol was added to the reaction mixture in an amount of 25.3 g (0.1 mole) as diphenylmethane-4,4'-diisocyanate followed by stirring to provide polymer solution B.

Then, polymer solution A was mixed with polymer solution B to provide a wire enamel and after diluting the wire enamel with N-methyl-2-pyrrolidone until the viscosity became 200 cps at 30° C., the diluted solution was coated on a copper wire of 0.2 mm diameter and baked to provide an enameled wire. The properties of the enameled wire are shown in Table 3.

EXAMPLE 30

When a mixture of 118.2 g (1.0 mole) of 1,6-hexanediol, 200.2 g (0.8 mole) of diphenylmethane-4,4'- diisocyanate, and 318.4 g of N-methyl-2-pyrrolidone was stirred in a reaction vessel, the temperature of the reaction system began to increase after a time and then the temperature increased further to about 65° C. The temperature of the reaction system was increased to 120° C. by heating and the reaction was carried out for 1 hour at the same temperature. After the reaction was over, the reaction mixture was cooled and then the blocked isocyanate prepared by blocking the isocyanate group of diphenylmethane-4,4′-diisocyanate with cresol was added to the reaction mixture in an amount of 50.5 g (0.2 mole) as diphenylmethane-4,4′-diisocyanate together with 200 g of N-methyl-2-pyrrolidone to provide a wire enamel. After diluting the wire enamel with N-methyl-2-pyrrolidone until the viscosity thereof became 200 cps at 30° C., the diluted solution was coated on a copper wire of 0.2 mm diameter and baked to provide an enameled wire. The properties of the enameled wire are shown in Table 3.

EXAMPLE 31

When a mixture of 90.1 g (1.0 mole) of 1,4-butandiol, 200.2 g (0.8 mole) of diphenylmethane-4,4′-diisocyanate, and 200.3 g of N-methyl-2-pyrrolidone was stirred in a reaction vessel, the temperature of the reaction system began to increase after a time and then the temperature increased further to about 65° C. The temperature of the reaction system was increased to 120° C. by heating and the reaction was carried out for 1 hour at the same temperature. After the reaction was over, the reaction mixture was cooled. Thereafter, the blocked isocyanate prepared by blocking diphenylmethane-4,4′-diisocyanate with cresol was added to the reaction mixture in an amount of 47.5 g (0.19 mole) as diphenylmethane-4,4′-diisocyanate together with 200 g of N-methyl-2-pyrrolidone to provide a wire enamel. After diluting the wire enamel with N-methyl-2-pyrrolidone until the viscosity thereof became 200 cps. at 30° C., the diluted solution was coated on a copper wire of 0.2 mm diameter and baked to provide an enameled wire. The properties of the enameled wire are shown in Table 3.

EXAMPLE 32

When a mixture of 118.2 g (1.0 mole) of 1,6-hexanediol, 175.2 g (0.7 mole) of diphenylmethane-4,4′-diisocyanate, and 293.4 g of N-methyl-2-pyrrolidone was stirred in a reaction vessel, the temperature of the reaction system began to increase after a time and then the temperature increased further to about 65° C. The temperature of the reaction system was increased to 120° C. by heating and the reaction was carried out for 1 hour at the same temperature. After the reaction was over, the reaction mixture was cooled and then the blocked isocyanate prepared by blocking the isocyanate group of diphenylmethane-4,4′-diisocyanate with xylenol was added to the reaction mixture in an amount of 75.8 g (0.3 mole) as diphenylmethane-4,4′-diisocyanate together with 270 g of N-methyl-2-pyrrolidone to provide a wire enamel. After diluting the wire enamel with N-methyl-2-pyrrolidone until the viscosity thereof became 200 cps at 30° C., the diluted solution was coated on a copper wire of 0.2 mm diameter and baked to provide an enameled wire. The properties of the enameled wire are shown in Table 3.

EXAMPLE 33

When a mixture of 118.2 g (1.0 mole) of 1,6-hexanediol, 101.0 g (0.4 mole) of diphenylmethane-4,4′-diisocyanate, 52.2 g (0.3 mole) of tolylene diisocyanates (a 80:20 by weight mixture of 2,4-tolylene diisocyanate and 2,6-tolylene diisocyanate), and 243.3 g of N-methyl-2-pyrrolidone was stirred in a reaction vessel, the temperature of the reaction system began to increase after a time and the temperature increased further to about 65° C. The temperature of the reaction system was increased to 120° C. by heating and the reaction was carried out for 1 hour at the same temperature. After the reaction was over, the reaction mixture was cooled and then the blocked isocyanate prepared by blocking the isocyanate group of diphenylmethane-4,4′-diisocyanate with cresol was added to the reaction mixture in an amount of 75.8 g (0.3 mole) as diphenylmethane-4,4′-diisocyanate together with 250 g of N-methyl-2-pyrrolidone to provide a wire enamel. After diluting the wire enamel with N-methyl-2-pyrrolidone until the viscosity thereof became 200 cps at 30° C., the diluted solution was coated on a copper wire and baked to provide an enameled wire. The properties of the enameled wire are shown in Table 3.

EXAMPLE 34

When a mixture of 90.1 g (1.0 mole) of 1,4-butanediol, 175.2 g (0.7 mole) of diphenylmethane-4,4′-diisocyanate, and 265.3 g of N-methyl-2-pyrrolidone was stirred in a reaction vessel, the temperature of the reaction system began to increased after a time and then the temperature increased further to about 60° C. The temperature of the reaction system was increased to 120° C. by heating and the reaction was carried out for 1 hour at the same temperature. After the reaction was over, the reaction mixture was cooled and then the blocked isocyanate prepared by blocking the isocyanate group of diphenylmethane-4,4′-diisocyanate with xylenol was added to the reaction mixture in an amount of 65.1 g (0.26 mole) as diphenylmethane-4,4′-diisocyanate together with 270 g of N-methyl-2-pyrrolidone to provide a wire enamel. After diluting the wire enamel with N-methyl-2-pyrrolidone until the viscosity thereof became 200 cps. at 30° C., the diluted solution was coated on a copper wire of 0.2 mm diameter and baked to provide an enameled wire. The properties of the enameled wire are shown in Table 3.

EXAMPLE 35

The wire enamel obtained in Example 30 was coated on a copper wire of 0.3 mm diameter and backed to provide an enameled wire. The properties of the enameled wire are shown in Table 3.

EXAMPLE 36

The wire enamel obtained in Example 30 was diluted with N-methyl-2-pyrrolidone until the viscosity thereof became 100 cps. at 30° C. and the diluted solution was coated on a copper wire of 0.13 mm diameter and baked to provide an enameled wire. The properties of the enameled wire are shown in Table 4.

EXAMPLE 37

The wire enamel obtained in Example 31 was diluted with N-methyl-2-pyrrolidone until the viscosity thereof became 100 cps at 30° C. and the diluted solution was coated on a copper wire of 0.13 mm diameter and baked to provide an enameled wire. The properties of the enameled wire are shown in Table 4.

EXAMPLE 38

The wire enamel obtained in Example 33 was diluted with N-methyl-2-pyrrolidone until the viscosity thereof became 100 cps at 30° C. and the diluted solution was coated on a copper wire of 0.13 mm diameter and baked to provide an anameled wire. The properties of the enameled wire are shown in Table 4.

EXAMPLE 39

By dissolving 12 nylon (Daiamide L-1640, made by Daicel-Hüls Co.) in cresol, homogeneous and transparent wire enamel A was obtained. After diluting the wire enamel prepared in Example 30 with N-methyl-2-pyrrolidone until the viscosity thereof became 100 cps at 30° C, the diluted solution was coated on a copper wire of 0.13 mm diameter and baked at a film thickness of 10 microns. Furthermore, wire enamel A was coated on the coated layer and baked at a film thickness of 5 microns. The thickness of the total layers of films of the enameled wire was 15 microns. The properties of the enameled wire are shown in Table 4.

In addition, all of the enameled wires prepared in Examples 1 to 39 generated only a very slight amount of smoke at fusing in the fusing test and also the coatings of the enameled wires were not discolored after fusing.

REFERENCE EXAMPLE 1

By dissolving each of 6,10-nylon (CM 2001, made by Toray Co.), 6-nylon (CM 1001, made by Toray Co.), 6,6-nylon (CM 3001, made by Toray Co.), and phenoxy resin (PKHH 8500, made by Union Carbide Co.) in cresol, a wire enamel was prepared. The 6,10-nylon wire enamel prepared above was coated on a copper wire of 0.2 mm diameter and baked to provide an enameled wire. Each of the other three kinds of the wire enamels and a commercially available polyurethane wire enamel and a commercially available polyvinyl formal wire enamel was also coated on a copper wire of 0.3 mm diameter and baked to provide an enameled wire. The enameled wires thus prepared were subjected to the fusing test and the results obtained are shown below. These enameled wires generated a large amount of smoke at the smoking temperature. Also, the coatings of the enameled wires were all scorched black after fusing.

| | Fusing Test Results | | | | | |
|---|---|---|---|---|---|---|
| | 6.10-Nylon-coated Wire | 6-Nylon-coated Wire | 6.6-Nylon-coated Wire | Phenoxy-coated Wire | Polyvinyl Formal-coated Wire | Polyurethane-coated Wire |
| Fused Temperature (°C.) | 295 | 320 | 320 | 297 | 393 | 308 |
| Smoking Temperature (°C.) | | 296 | 298 | 274 | 259 | 135 |

TABLE 1

| Example No. | Size of Enameled Wire: Bare Diameter (mm) | Overall Diameter (mm) | Film Thickness (mm) | Heat Shock (130° C. × 1 hr. after 10% elongation) | Heat Aging (15% elongation after 170° C. × 6 hrs.) | Break Down Voltage (KV) | Anti-Cut-Thru Property, Elevation of Temp.: 0.5° C./min, 200 g Load: 200 g Load | 300 g Load |
|---|---|---|---|---|---|---|---|---|
| 1 | 0.300 | 0.328 | 0.014 | good | good | 4.8 | | 189 |
| 2 | 0.200 | 0.223 | 0.012 | good | | 4.5 | 225 | 170 |
| 3 | 0.198 | 0.226 | 0.014 | good | | 5.4 | 226 | 169 |
| 4 | 0.193 | 0.216 | 0.012 | good | | 4.9 | 224 | 163 |
| 5 | 0.199 | 0.227 | 0.014 | good | | 5.3 | 220 | 161 |
| 6 | 0.198 | 0.226 | 0.014 | good | | 5.4 | 218 | 165 |
| 7 | 0.200 | 0.227 | 0.014 | good | | 5.1 | 215 | |
| 8 | 0.201 | 0.227 | 0.013 | good | | 4.9 | 210 | |
| 9 | 0.197 | 0.231 | 0.017 | good | | 6.0 | 222 | |
| 10 | 0.199 | 0.227 | 0.014 | good | | 5.3 | 210 | |
| 11 | 0.195 | 0.223 | 0.014 | good | | 5.0 | 228 | |
| 12 | 0.300 | 0.330 | 0.015 | good | good | 5.0 | | 193 |
| 13 | 0.202 | 0.228 | 0.014 | good | | 4.8 | 231 | 171 |
| 14 | 0.200 | 0.227 | 0.014 | good | | 4.7 | | 220 |

| Example No. | Repeated scrape 220 g Load (times) | Flexibility | Coherence between Insulating Layer and Conductor | Solderability, 380° C. (sec.) | Chemical Stability: Sulfuric Acid, specific gravity = 1.2: Appearance | Pencil Hardness | Benzene: Appearance | Pencil Hardness | Fusing Temperature (°C.) |
|---|---|---|---|---|---|---|---|---|---|
| 1 | 26 | good | good | 1 | good | 5H | good | 5H | 215 |
| 2 | | good | good | 1 | good | 5H | good | 5H | 205 |
| 3 | | good | good | 1 | good | 5H | good | 5H | 206 |
| 4 | | good | good | 1 | good | 5H | good | 5H | 205 |
| 5 | | good | good | 1 | good | 5H | good | 5H | 203 |
| 6 | | good | good | 1 | good | 5H | good | 5H | 202 |
| 7 | | good | good | 1 | good | 5H | good | 5H | 210 |
| 8 | | good | good | 1 | good | 5H | good | 5H | 206 |
| 9 | | good | good | 1 | good | 5H | good | 5H | 211 |
| 10 | | good | good | 1 | good | 5H | good | 5H | 209 |

TABLE 1-continued

| | | | | | | | | | |
|---|---|---|---|---|---|---|---|---|---|
| 11 | | good | good | 1 | good | 5H | good | 5H | 209 |
| 12 | 27 | good | good | 1 | good | 5H | good | 5H | 213 |
| 13 | | good | good | 1 | good | 5H | good | 5H | 206 |
| 14 | | good | good | 1 | good | 5H | good | 5H | 220 |

TABLE 2

| Example No. | Size of Enameled Wire Bare Diameter (mm) | Overall Diameter (mm) | Film Thickness (mm) | Heat Shock (130° C. × 1 hr. after 10% elongation) | Break Down Voltage (KV) | Anti-Cut-Thru Property, Elevation of Temperature: 0.5° C./min, 200 g Load |
|---|---|---|---|---|---|---|
| 15 | 0.199 | 0.227 | 0.014 | good | 5.2 | 229 |
| 16 | 0.200 | 0.229 | 0.015 | good | 5.3 | 224 |
| 17 | 0.200 | 0.230 | 0.015 | good | 5.1 | 228 |
| 18 | 0.199 | 0.226 | 0.014 | good | 4.9 | 230 |
| 19 | 0.198 | 0.228 | 0.015 | good | 5.3 | 228 |
| 20 | 0.200 | 0.230 | 0.015 | good | 5.3 | 218 |
| 21 | 0.201 | 0.229 | 0.014 | good | 5.2 | 209 |
| 22 | 0.199 | 0.226 | 0.013 | good | 4.9 | 227 |
| 23 | 0.199 | 0.228 | 0.015 | good | 5.0 | 235 |

| Example No. | Flexibility | Coherence between Insulating Layer and Conductor | Solderability, 380° C. (sec.) | Chemical Stability: Sulfuric Acid, specific gravity = 1.2 Appearance | Pencil Hardness | Benzene Appearance | Pencil Hardness | Fusing Temperature (°C.) |
|---|---|---|---|---|---|---|---|---|
| 15 | good | good | 1 | good | 5H | good | 5H | 209 |
| 16 | good | good | 1 | good | 5H | good | 5H | 203 |
| 17 | good | good | 1 | good | 5H | good | 5H | 211 |
| 18 | good | good | 1 | good | 5H | good | 5H | 209 |
| 19 | good | good | 1 | good | 5H | good | 5H | 213 |
| 20 | good | good | 1 | good | 5H | good | 5H | 203 |
| 21 | good | good | 1 | good | 5H | good | 5H | 198 |
| 22 | good | good | 1 | good | 5H | good | 5H | 208 |
| 23 | good | good | 1 | good | 5H | good | 5H | 215 |

TABLE 3

| Example No. | Film Thickness (mm) | Heat Shock, (130° C. × 1 hr. after 10% elongation) | Heat Aging, (15% elongation after 170° C. × 6 hrs.) | Break Down Voltage (KV) | Anti-Cut-Thru Property Elevation of Temp.: 0.5° C./min, 200 g Load | Repeated scrape 220 g Load (time) |
|---|---|---|---|---|---|---|
| 24 | 0.013 | good | | 4.3 | 227 | |
| 25 | 0.014 | good | | 4.5 | 231 | |
| 26 | 0.013 | good | | 4.6 | 213 | |
| 27 | 0.015 | good | | 5.1 | 216 | |
| 28 | 0.014 | good | | 4.8 | 228 | |
| 29 | 0.013 | good | | 4.7 | 230 | |
| 30 | 0.015 | good | | 5.3 | 230 | |
| 31 | 0.015 | good | | 5.3 | 232 | |
| 32 | 0.013 | good | | 4.6 | 225 | |
| 33 | 0.014 | good | | 4.9 | 208 | |
| 34 | 0.014 | good | | 5.2 | 228 | |
| 35 | 0.014 | good | good | 4.9 | 189 (300 g Load) | 28 |

| Example No. | Flexibility | Coherence between Insulating Layer and Conductor | Solderability 380° C. (sec.) | Chemical Stability: Sulfuric Acid, specific gravity = 1.2 Appearance | Pencil Hardness | Benzene Appearance | Pencil Hardness | Fusing Temperature (°C.) |
|---|---|---|---|---|---|---|---|---|
| 24 | good | good | 1 | good | 5H | good | 5H | 218 |
| 25 | good | good | 1 | good | 5H | good | 5H | 221 |
| 26 | good | good | 1 | good | 5H | good | 5H | 209 |
| 27 | good | good | 1 | good | 5H | good | 5H | 203 |
| 28 | good | good | 1 | good | 5H | good | 5H | 220 |
| 29 | good | good | 1 | good | 5H | good | 5H | 218 |
| 30 | good | good | 1 | good | 5H | good | 5H | 220 |
| 31 | good | good | 1 | good | 5H | good | 5H | 219 |
| 32 | good | good | 1 | good | 5H | good | 5H | 215 |
| 33 | good | good | 1 | good | 5H | good | 5H | 205 |
| 34 | good | good | 1 | good | 5H | good | 5H | 217 |
| 35 | good | good | 1 | good | 5H | good | 5H | 220 |

TABLE 4

| Example No. | Film Thickness (mm) | Heat Shock (130° C × 1 hr. after 10% elongation) | Break Down Voltage (KV) | Anti-Cut-Thru Property twice pair, 160° C. × 6 hrs. |
|---|---|---|---|---|
| 36 | 0.016 | good | 5.6 | good |
| 37 | 0.015 | good | 5.1 | good |
| 38 | 0.015 | good | 5.2 | good |
| 39 | 0.015 | good | 6.4 | good |

| | | | | Chemical Stablitiy | | |
|---|---|---|---|---|---|---|
| Example No. | Flexibility | Coherence between Insulating Layer and Conductor | Solderability, 380° C. (sec.) | Sulfuric Acid, specific gravity = 1.2 Appearance | Benzene Appearance | Fusing Temperature (°C.) |
| 36 | good | good | 1 | good | good | 205 |
| 37 | good | good | 1 | good | good | 201 |
| 38 | good | good | 1 | good | good | 197 |
| 39 | good | good | 1 | good | good | 214 |

While the invention has been described in detail and with reference to specific embodiments thereof, it will be apparent to one skilled in the art that various changes and modifications can be made therein without departing from the spirit and scope thereof.

What is claimed is:

1. An insulated enameled wire which exhibits a fusing function to short circuit with adjacent wires due to the provision of an insulating thermoplastic straight chain polyurethane layer thereon which melts fuses at an inside temperature of about 150° to 250° C. without substantially generating smoke thereby permiting short circuiting with adjacent wires, which comprises a conductive wire having coated thereon said insulating thermoplastic straight chain polyurethane layer which is formed by coating a layer consisting essentially of a member selected from the group consisting of the following: components (i) and (ii); components (i) and (iii); or components (i), (ii) and (iii) as defined below;

(i) a polyurethane having a terminal hydroxyl group prepared from at least one aliphatic diol, at least one diisocyanate compound selected from the group consisting of a diisocyanate and a blocked diisocyanate in less than about an equimolar amount of said aliphatic diol;

(ii) a polyurethane having a terminal blocked isocyanate group prepared from at least one diisocyanate compound selected from the group consisting of a diisocyanate and a blocked diisocyanate, at least one aliphatic diol in less than about an equimolar amount of said diisocyanate, and a blocking agent for an isocyanate group; and (iii) a blocked diisocyanate, wherein at least a portion of said diisocyanate compound in (i), (ii) and (iii) is an aromatic diisocyanate on said conductive wire and then baking the thus coated conductive wire to yield said insulating thermoplastic straight chain polyurethane layer.

2. The enameled wire of claim 1, wherein the molar proportion of said diisocyanate compound to said diol ranges from about 0.9:1 to about 1.1:1.

3. The enameled wire of claim 1, wherein the molar proportion of said diisocyanate compound is 0.93:1 to less than 1:1 to said diol.

4. The emameled wire of claim 1, wherein the diisocyanate compound is represented by the general formula

OCN—R—NCO wherein R is a divalent aromatic group and wherein said diol is represented by the general formula

HO—R′—OH wherein R′ is a divalent group having at least 2 carbon atoms.

5. The enameled wire of claim 1, wherein said diisocyanate compound is an aliphatic diisocyanate, an alicyclic diisocyanate, an aromatic diisocyanate or a mixture thereof.

6. The enameled wire of claim 1, wherein said blocked diisocyanate is a diisocyanate blocked with a compound capable of forming an addition product with an isocyanate by reaction with an isocyanate group.

7. The enameled wire of claim 1, wherein said blocking agent is a compound capable of forming an addition product with an isocyanate by reaction with an isocyanate group.

8. The enameled wire of claim 4, wherein R is a divalent aromatic group.

9. The enameled wire of claim 1, wherein said blocked diisocyanate is a blocked aromatic diisocyanate and said blocking agent is a compound having a phenolic hydroxyl group.

10. The enameled wire of claim 4, wherein R′ is a divalent aliphatic straight chain group.

11. The enameled wire of claim 1, wherein said diol is an aliphatic straight chain diol represented by the general formula $HO—(CH_2)_n—OH$ wherein n is an integer of at least two.

12. The enameled wire of claim 1, wherein said diisocyanate compound (i), (ii) or (iii) is only an aromatic diisocyanate compound or a mixture of only aromatic diisocyanate compounds.

13. The enameled wire of claim 12, wherein said aromatic diisocyanate compound is selected from the group consisting of 4,4′-diphenylmethane diisocyanate, 4,4′-diphenyl ether diisocyanate, 2,4′-tolylene diisocyanate and 2,6-tolylene diisocyanate.

14. The enameled wire of claim 1, wherein said diisocyanate compound is said diisocyanate.

15. The enameled wire of claim 1, wherein said diisocyanate compound is said blocked diisocyanate.

16. The enameled wire of claim 15, wherein said member consists essentially of components (i) and (ii).

17. The enameled wire of claim 15, wherein said member consists essentially of components (i) and (iii).

18. The enameled wire of claim 15, wherein said member consists essentially of components (i), (ii) and (iii).

19. The enameled wire of claim 17, wherein said blocked diisocyanate is blocked with a blocking agent having a phenolic hydroxyl group.

20. The enameled wire of claim 1, wherein said insulating straight chain polyurethane melts at an inside temperature of about 170° to 230° C.

21. The enameled wire of claim 1, wherein the layer which is coated consists of a member of said group.

22. The enameled wire of claim 1, wherein in component (i) a blocking agent for an isocyanate group is further present.

* * * * *